(12) United States Patent
Hamill

(10) Patent No.: US 11,768,300 B2
(45) Date of Patent: Sep. 26, 2023

(54) TRANSMISSION IMAGING IN A PET SCANNER BASED ON FORWARD-SCATTERED GAMMA RAYS WITH COINCIDENCE DETECTION

(71) Applicant: Siemens Medical Solutions USA, Inc., Malvern, PA (US)

(72) Inventor: James Hamill, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 17/756,910

(22) PCT Filed: Apr. 20, 2021

(86) PCT No.: PCT/US2021/070429
§ 371 (c)(1),
(2) Date: Jun. 6, 2022

(87) PCT Pub. No.: WO2021/222921
PCT Pub. Date: Nov. 4, 2021

(65) Prior Publication Data
US 2023/0003909 A1 Jan. 5, 2023

Related U.S. Application Data

(60) Provisional application No. 63/018,654, filed on May 1, 2020.

(51) Int. Cl.
*G01T 1/161* (2006.01)

(52) U.S. Cl.
CPC .......... *G01T 1/1612* (2013.01); *G01T 1/1617* (2013.01)

(58) Field of Classification Search
CPC ... G01T 1/1612; G01T 1/1617; G01T 1/2985; G01T 1/2978; A61B 6/0407; A61B 6/54; A61B 6/541; A61B 6/469; A61B 6/037; A61N 5/1067; A61N 5/1081; A61N 2005/1072; A61N 2005/1089; A61N 2005/1087; A61N 2005/1074; A61N 2005/109; A61N 2005/1052
See application file for complete search history.

(56) References Cited

U.S. PATENT DOCUMENTS

| 2003/0021375 | A1 | 1/2003 | Jones et al. | |
|---|---|---|---|---|
| 2010/0127179 | A1* | 5/2010 | Tonami | G01T 1/1644 250/363.05 |
| 2011/0198504 | A1* | 8/2011 | Eigen | G01T 1/2985 250/361 R |
| 2013/0032721 | A1 | 2/2013 | Michel et al. | |

(Continued)

FOREIGN PATENT DOCUMENTS

CN 101460864 A * 6/2009 ........... G01T 1/1644

OTHER PUBLICATIONS

Translation of CN-101460864-A (Year: 2009).*

(Continued)

*Primary Examiner* — David P Porta
*Assistant Examiner* — Mamadou Faye

(57) ABSTRACT

Disclosed is a novel method of obtaining transmission scan data in a PET scanner by incorporating one or more stationary gamma-ray sources that provide forward scattered gamma-photons that can be used as transmission imaging radiation.

18 Claims, 12 Drawing Sheets

(56) References Cited

U.S. PATENT DOCUMENTS

| | | | | |
|---|---|---|---|---|
| 2014/0175293 A1* | 6/2014 | Fukuchi | ............... | A61B 6/037 |
| | | | | 250/363.04 |
| 2014/0217294 A1* | 8/2014 | Rothfuss | ............. | G01T 1/1617 |
| | | | | 250/362 |
| 2016/0081641 A1* | 3/2016 | Bouhnik | ............... | A61B 6/06 |
| | | | | 378/5 |
| 2018/0180745 A1* | 6/2018 | Uchida | ............... | G01T 1/2985 |
| 2021/0239862 A1* | 8/2021 | Petrak | ................. | G01T 1/2907 |

OTHER PUBLICATIONS

International Search Report for Corresponding PCT Application No. PCT/US2021/070429.

Watson, C. C., et al. "Design and performance of a single photon transmission measurement for the ECAT ART." 1997 IEEE Nuclear Science Symposium Conference Record. vol. 2. IEEE, 1997.

De Jong, Hugo Wam, et al. "Correction for emission contamination in transmission scans for the high resolution research tomograph." IEEE Transactions on Nuclear Science 51.3 (2004): 673-676.

* cited by examiner

Side View

TRANSMISSION IMAGING IN A PET SCANNER BASED ON FORWARD-SCATTERED GAMMA RAYS WITH COINCIDENCE DETECTION

CROSS-REFERENCE TO RELATED APPLICATIONS

This application claims the benefit of U.S. Provisional Application No. 63/018,654, filed May 1, 2020, the disclosure of which is incorporated herein by reference in its entirety.

FIELD

The present disclosure relates to nuclear imaging. More particularly, this disclosure relates to attenuation correction in positron emission tomography (PET).

BACKGROUND

PET is a nuclear medicine imaging technique that produces a three-dimensional image representing the distribution of positron emitting isotopes within a body. As the radioisotope undergoes positron emission decay (also known as positive beta decay), it emits the antimatter counterpart of electrons. As the positrons lose energy, they ultimately encounter and annihilate with electrons, usually producing a pair of annihilation (gamma) photons moving in opposite directions. The PET system determines the line along which the annihilation occurred, by detecting the pair of gamma photons in time coincidence.

Attenuation correction in PET imaging is an important component for the production of artifact-free, quantitative data. The most attenuation correction methods are based on measured transmission scans acquired before, during, or after the emission scan. The ability to acquire high-quality transmission data is beneficial in achieving accurate attenuation correction.

Attenuation in PET imaging is the loss of detection of true coincidence events because of their absorption in the body or due to their scattering out of the detector field of view (FOV). In PET imaging two photons must escape the patient simultaneously to be detected as a true event. The loss of true coincidence event detection due to attenuation in PET imaging can range between 50 to 95%.

Loss of counts due to attenuation increases image noise, image artifacts, and image distortion. Without attenuation correction, significant artifacts which may occur on whole-body PET scans include: (1) prominent activity at body surface edges due to relative lack of attenuation at the surfaces compared to deeper structures, (2) distorted appearance of areas of intense activity (e.g. urinary bladder) due to variable degrees of attenuation in different directions of activity originating from these areas, and (3) diffuse, relatively increased activity in tissues of relatively low attenuation (e.g. lungs). Therefore, attenuation correction of data is necessary for accurate measurements of PET scan data.

In PET/CT systems, x-rays from a CT scan are used to construct an attenuation map of density differences throughout the imaging target region that can then be used to correct for the absorption of the photons emitted from the fluorodeoxyglucose decay in the emission scan. However, such integrated PET/CT systems require the additional CT scanning hardware to be integrated with the PET imaging hardware. Thus, it would be useful if a transmission type scan data can be obtained using a PET scanner without the additional transmission scanning hardware such as a CT scanner to construct attenuation map. Such ability to obtain transmission type scan data in a PET scanner system for generating attenuation map would be useful in PET/MR systems also as the MR systems do not measure all of the things in the system that attenuate radiation in PET scans. For example, PET/MR systems use coils and the associated electronics and cables which attenuate the annihilation photons but, by design, they are ignored so that they do not show up in the MR images and their effect on annihilation photon attenuation cannot be accounted for.

Some PET scanner designs have been proposed in which attenuation correction is derived from background radiation emitted in the lutetium-based scintillation crystals in the detectors themselves (e.g. LSO or LYSO scintillation crystals, for example). However, the intensity of the LSO background radiation is generally too low to be used in patient scans of normal duration. Thus, improved PET scanners that can generate transmission imaging data faster to generate attenuation μ-map without the CT hardware would be beneficial.

SUMMARY

Provided is a PET scanner system that comprises a gantry; a plurality of PET detector ring assemblies provided within the gantry, where each detector ring assembly comprises a plurality of PET detectors arranged in a ring configuration around a central opening, where the plurality of PET detector ring assemblies are coaxially aligned along a longitudinal axis defined through the central openings; a patient tunnel extending through the central openings of the coaxially aligned PET detector ring assemblies, wherein the plurality of PET detector assemblies are coaxially aligned along a length of the patient tunnel, wherein each of the plurality of PET detectors comprising a detector and one or more scintillator crystals associated with the detector; and one or more stationary gamma-ray sources provided in each of the PET detector ring assembly within the gantry.

Also provided is a method for using one or more stationary gamma-ray sources provided in a PET scanner as a transmission scan radiation source for generating scan data that can be used to generate attenuation maps, where the PET scanner comprises a plurality of PET detector ring assemblies. The method comprises: (a) providing the one or more stationary gamma-ray sources in each of the PET detector ring assemblies where the stationary gamma-ray sources are positioned outside the detector ring assembly; (b) identifying forward scattered gamma-photons which are gamma-photons that emanated from the stationary gamma-ray sources that have forward scattered through a scintillator crystal in a first set of detector blocks in a PET detector ring assembly, traversed through the PET scanner's field of view (FOV), and are detected by a scintillator crystal in a second set of detector blocks in the PET detector ring assembly, via the PET scanner's coincidence electronics; (c) acquiring list-mode data from a blank transmission scan with no activity in the FOV; (d) acquiring list-mode data from a transmission scan with a target body in the FOV; (e) generating an attenuation map by comparing the list-mode data from the blank transmission scan against the list-mode data from the transmission scan with the target body in the FOV; and (f) applying the attenuation map to the list-mode data from the emission scan in step (e) to effect attenuation correction on the list-mode data from the emission scan.

Also provided is a method for improving the quality of the transmission scan signal from the forward scattered gamma-photons by applying time-of-flight (TOF) consideration to the transmission imaging scan using the stationary gamma-ray sources comprises: (a) calculating a TOF for scattered photons, which are photons from the gamma-ray sources that have undergone Compton scatter in the first scintillator crystal in the first detector block, to reach a second scintillator crystal in the second detector block, based on the distance between the two scintillator crystals; (b) a time window is defined, where the time window has a width centered around the calculated TOF; (c) TOF of actual scattered gamma-photons originating from the first scintillator crystal are measured with a scan target object in the PET scanner's FOV; (d) the measured TOF from (c) are compared against the calculated TOF and the measured TOF that are within the time window are identified; and (e) the scattered gamma-photons corresponding to those measured TOF that are within the time window are identified as transmission source events originating from the Compton scattering in the first scintillator crystal, thereby discriminating the transmission type data from the gamma emitting annihilation events within the scan target object and random events.

DETAILED DESCRIPTION

This description of the exemplary embodiments is intended to be read in connection with the accompanying drawings, which are to be considered part of the entire written description.

PET emission data as collected in a traditional PET scan includes all information of the physical effects that emission photons undergo prior to detection in a detector. To reconstruct the collected emission data, corrections to the emission data are performed in order to reconstruct the true measured emission events. System corrections such as normalization, randoms and dead time corrections are independent of the object in the FOV and are primarily dependent on the system and count rates of the activities that illuminate the PET detectors in and out of the FOV. Other corrections are object dependent such as the attenuation correction and scatter estimation and require attenuation information of the object's material in the scanner's FOV.

[General Workings of a PET Scanner]

Figure 1A:
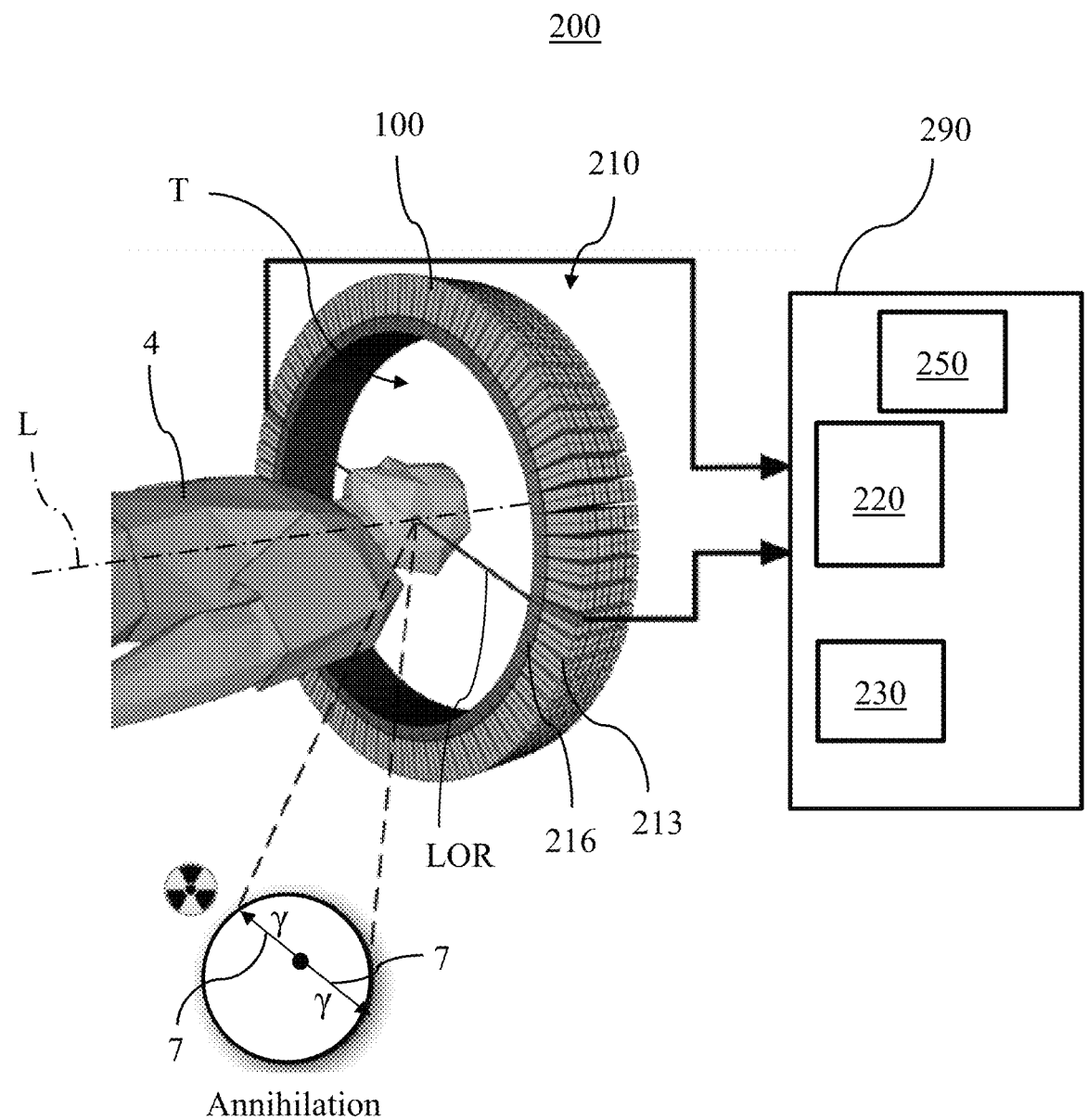
FIG. 1A is a schematic illustration of a PET system.

FIG. 1A shows an example of a PET scanner system 200 in which the inventive concepts disclosed herein can be implemented. A human subject 4 for PET scanning is shown positioned inside a gantry 210 of the PET scanner system 200. The gantry 210 comprises a plurality of PET detector rings 100. Each detector ring comprises multiple scintillating crystals 216 and the associated detector 213. The open space in the center of the detector rings 100 define the patient tunnel T of the gantry 210 and the FOV of the PET scanner. When a PET scan is performed, a positron-emitting radioisotope 6 is introduced into the human subject 4 on metabolically active molecules. The metabolically active molecules are then carried to an organ of interest by the human subject's blood flow.

When a positron emitted from the radioisotope now inside the human subject encounters an electron, both are annihilated, yielding two gamma photons 7 that travel in approximately opposite directions. The annihilation events are identified by a time coincidence between the detection of the two gamma photons by two oppositely disposed detectors by the interaction of the gamma photons with the detector's scintillating crystals 216, i.e., the gamma photon emissions are detected virtually simultaneously by each detector 213. When two oppositely traveling gamma photons strike corresponding oppositely disposed detectors to produce a time coincidence event, the photons identify a line of response (LOR) along which the annihilation event has occurred.

Images of metabolic activity in the human subject 4 (nuclear medical images) are reconstructed by computer analysis. The PET scanner system 200 includes a system controller 290 connected to and in communication with the detector rings 100. The PET scanner system 200 further comprises a data processing unit (event detection unit) 220 which determines and evaluates coincidence events generated by the pair of gamma rays and forwards this information to an image processing unit (computational unit) 230. Detector pairs associated to each LOR produce many coincidence events during a measurement session (i.e. data acquisition scan). The PET scanner system 200 further includes at least one machine-readable storage medium 250 that is encoded with a computer program code which when executed by the system controller 290, the system controller performs various operational functions of the PET scanner system 200.

[Improvement Provided by the Present Disclosure]

Figure 1B:
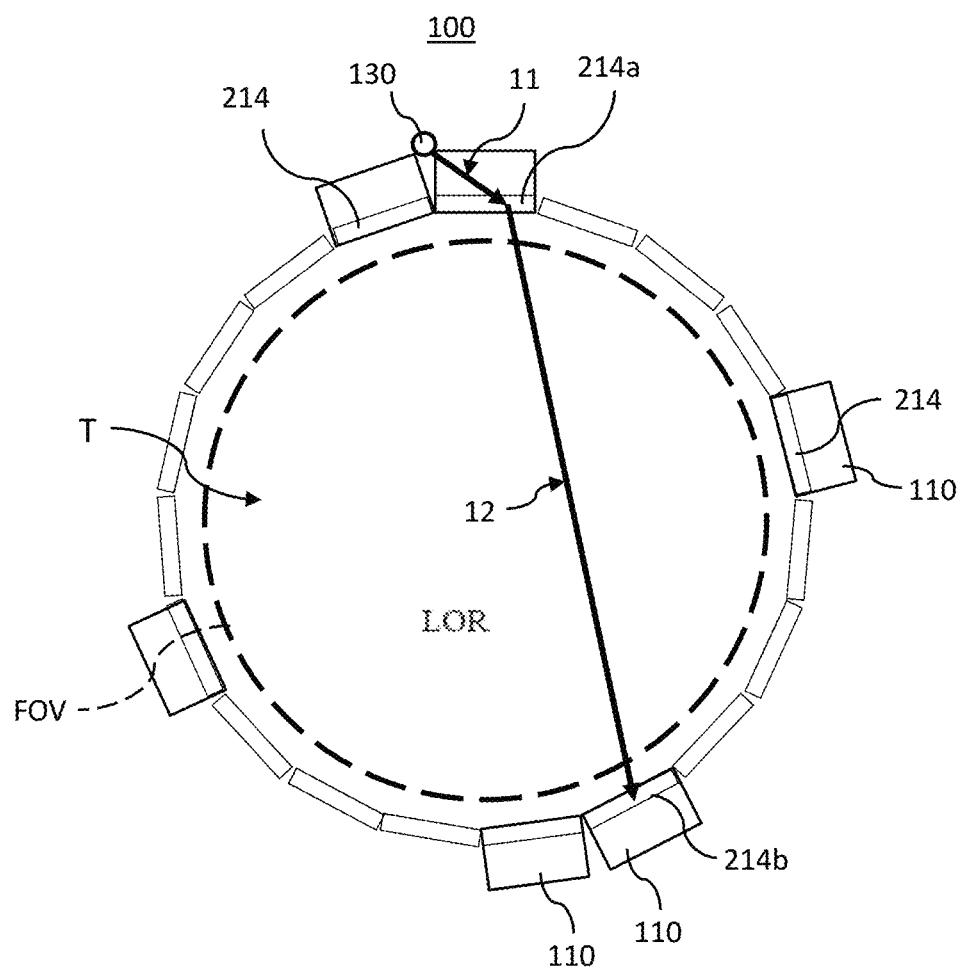
FIG. 1B is a schematic illustration of a PET detector ring assembly with a stationary gamma-ray source according to an embodiment of the present disclosure.

Referring to FIG. 1B, a novel configuration for a PET scanner system is provided that allows simultaneous generation of transmission scan data during PET scan sessions according to the present disclosure. To provide the PET scanner with a facility to generate a simultaneous transmission scan data during PET scan sessions, one or more stationary gamma-ray sources 130 are incorporated into each of the PET detector ring assembly 100 in the gantry

210. Each of the PET detector ring assembly 100 comprises a plurality of detector electronic assemblies 110 arranged in a ring configuration around the patient tunnel T. Each detector electronic assembly 110 includes, among other things, a detector 213 (a photo-detector), associated one or more scintillator crystals 216. FIG. 1B is schematic and for simplifying the illustration, the detector 213 and the associated one or more scintillator crystals 216 are, as a group, referred to as a PET detector block 214. This nomenclature will be carried through the remainder of this disclosure.

The stationary gamma-ray source 130 is located within the PET gantry 210 and positioned close to but behind the PET detector blocks 214 away from the patient tunnel T so that some of the gamma photons from the gamma-ray source forward scatter through a first scintillator crystal associated with a first PET detector block 214a, then across the PET scanner's FOV to a second scintillator crystal associated with a second PET detector block 214b on the opposite side of the PET scanner's FOV. The gamma-ray sources 130 are preferably positioned within the PET gantry 210 for practical reasons to shield and contain the gamma rays within the PET scanner.

In FIG. 1B, the arrow 11 represents an exemplary gamma-photon forward scattering through the first scintillator crystal of the first detector block 214a, then the arrow 12 represents the trajectory of the scattered gamma-photon crossing the PET scanner's FOV and reaching the second scintillator crystal of the second detector block 214b. The scattered gamma-photon is denoted by 12. Because the forward scattered gamma-photon 12 goes through the FOV, by identifying sufficient number of such forward scattered gamma-photons via the PET scanner's coincidence electronics, the scattered gamma-photons 12 can be used for transmission imaging in that PET scanner.

In some preferred embodiments, the one or more stationary gamma-ray sources 130 in each detector ring assembly 100 are positioned behind the detector blocks 214. This configuration allows more of the gamma-photons emitting from the gamma-ray source 130 to forward scatter through the scintillator crystals in one or more nearby detector blocks 214 thus increasing the amount of radiation for the transmission imaging.

Figure 1C:
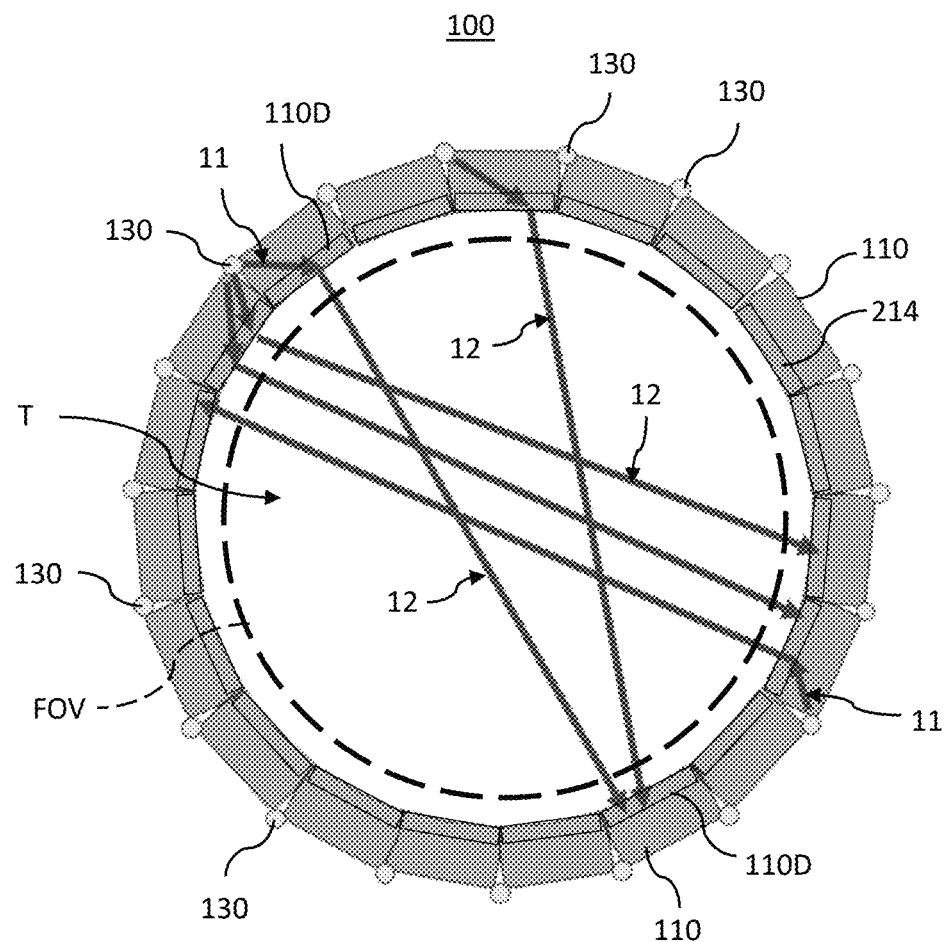
FIG. 1C is a schematic illustration of a PET detector ring assembly with multiple stationary gamma-ray sources according to an embodiment of the present disclosure.

Referring to FIG. 1C, providing and identifying a sufficient number of forward scattered gamma-photons for transmission imaging would be more practicably achieved by providing a plurality of stationary gamma-ray sources 130 in each of the PET detector ring assembly 100. All of the gamma-ray sources 130 are located behind the PET detector blocks 214 as illustrated in FIG. 1B. Being positioned behind the PET detector blocks 214 refers to a position that is anywhere on the side of the detector blocks 214 that is facing away from the patient tunnel T. The gamma-ray sources 130 can be positioned anywhere within the gantry as long as they are behind the PET detector blocks 214. However, in some preferred embodiments, each stationary gamma-ray source 130 is positioned to align between a pair of detector electronics assemblies 100, i.e., in between two sets of PET detector blocks 214, as shown in FIGS. 1B and 1C, to maximize the detection of the forward scattering photons by the detectors. If a gamma-ray source is directly behind a detector, that corresponds to zero-degree scatter which cannot be detected because the scattering process in that case leaves almost no energy in the detector where it scatters. The scattering process is not detectable until the energy left behind in scattering is above the threshold of the detector electronics (the particular threshold value varies depending on the PET scanner manufacturer but an example is about 150 keV), so the most favorable scatter angles are about 40 degrees or more. This can be achieved by positioning the stationary gamma-ray source 130 behind the PET detector blocks 214 and between a pair of detector electronic assemblies 110. When the gamma-ray source is positioned behind the PET detector blocks 214 and between a pair of detector electronic assemblies 110, the two detector blocks 214 to either side are well positioned for scattering.

All of the stationary gamma-ray sources 130 would be emitting some gamma-photons that forward scatter through the FOV thus providing more radiation necessary for transmission imaging. FIG. 1C is merely a schematic illustration and the number of detector electronic assemblies, detector blocks 214, and the gamma-ray sources 130 illustrated do not represent the actual numbers that would be in an actual PET scanner system employing the embodiments of the present disclosure.

With this configuration, the scattering event in a first scintillator crystal in the first PET detector block 214a provides the start signal for the coincidence electronics and the detection of the scattered gamma photon 12 by a second scintillator crystal in the second PET detector block 214b provides the stop signal for the coincidence electronics to detect coincidence. A photon from the gamma-ray source undergoes Compton scattering in a scintillating crystal of the first PET detector block 214a. Some of the photon's energy is transferred to an electron in the scintillator, and this electron is immediately stopped by its interaction with the scintillator, resulting in a flash of light in one scintillator crystal of the first PET detector block 214a, this resulting in a start signal for the coincidence electronics. The forward scattered gamma-photon 12 with reduced energy travels across the FOV and is detected by a second detector block 214b providing a stop signal for the coincidence electronics. This coincidence detection identifies two scintillation crystals in the PET detector ring assembly 100, and because two points in space define the scattered photon's straight-line path across space, counting the gamma-photons 12 traveling through the FOV provides the transmission sinogram.

Thus, generating transmission scan data using the emission from the stationary gamma-ray sources 130 without any patient in the FOV generates blank transmission scan sinograms. By comparing the blank transmission sinograms against transmission sinograms from a transmission scan with a scan target volume in the FOV, a mu map (a spatial map of the photon attenuation coefficients) of the target volume can be constructed for attenuation correction of the emission PET scan data for the target volume.

A number of radioactive isotopes can be used for the gamma-ray sources 130. Some examples are cesium-137, cobalt-60, and sodium-22. In some preferred embodiments, Cs-137 is used for the gamma-ray sources 130. Cs-137 is a good choice for the gamma-ray source 130 because the gamma ray energy is favorable, somewhat above 511 keV normally used in PET, but not so high that the gamma rays are out of the range normally used by many PET detectors. Also, the half-life of 30 years for Cs-137 is advantageous because the source would never need replacement in the expected life of the PET scanner. Also, there is just one gamma ray per decay whereas other isotopes have multiple gamma rays of different energies. Finally, the Cs-137 isotope is widely available because it is one of the main components in nuclear reactor waste after it has been in storage for several years.

According to the present disclosure, a PET system that is configured to perform the method of simultaneously obtaining PET emission scan and transmission scan data by incorporating stationary gamma-ray sources and time-of-flight-based coincidence measurements (TOF) comprises a PET detector ring assembly 100 illustrated in FIGS. 1B and 1C. The PET detector ring assembly 100 comprises a plurality of PET detectors arranged in a ring configuration around a central opening, wherein the plurality of PET detector ring assemblies are coaxially aligned along a longitudinal axis L (see FIG. 1A) defined through the central openings. A patient tunnel T extends through the central openings of the coaxially aligned PET detector ring assemblies 100. The plurality of PET detector assemblies are coaxially aligned along a length of the patient tunnel T.

Each detector electronic assembly 110 includes a PET detector block 214. Each detector block comprises a detector 213 and the associated one or more scintillator crystals 216. A plurality of gamma-ray sources 130 are positioned behind the PET detector blocks 214 as illustrated in FIG. 1B. Being positioned behind the PET detector blocks 214 refers to a position that is anywhere on the side of the detector blocks 214 that is facing away from the patient tunnel T. The gamma-ray sources 130 are preferably positioned within the PET gantry 210 for practical reasons to shield and contain the gamma rays within the PET scanner.

Still referring to FIG. 1C, with this arrangement of the gamma ray sources 130 and the PET detector blocks 214, the gamma photons 11 enter the first set of detector blocks 214 from the back side. Some of the gamma photons undergo Compton scatter within the scintillator crystal 216 of the first set of PET detector blocks 214 and forward-scatter across the PET scanner's FOV toward a second set of PET detector blocks 214 on the opposite side of the FOV. Then, when the scattered gamma photons encounter the scintillator crystals 216 associated with the second set of PET detector blocks, they are stopped and each scattered photon generates a flash of light serving as the stop signal for the coincidence electronics. The scattered photons are illustrated by the arrows 12. This provides the basis for transmission imaging when a target subject is positioned within the patient tunnel T and is within the FOV.

In some preferred embodiments of the disclosed system, the gamma-ray sources 130 can be provided with collimating shielding, allowing gamma photons directed toward the PET detectors 214 to shine with full intensity whereas gamma photons directed in other directions would be absorbed by the shielding, reducing possible radiation exposure to people near the scanner. The particular configuration for the collimating shielding can be designed in consideration of the particular radiation source selected for a given system to optimize the transmission imaging achieved.

Figure 2:
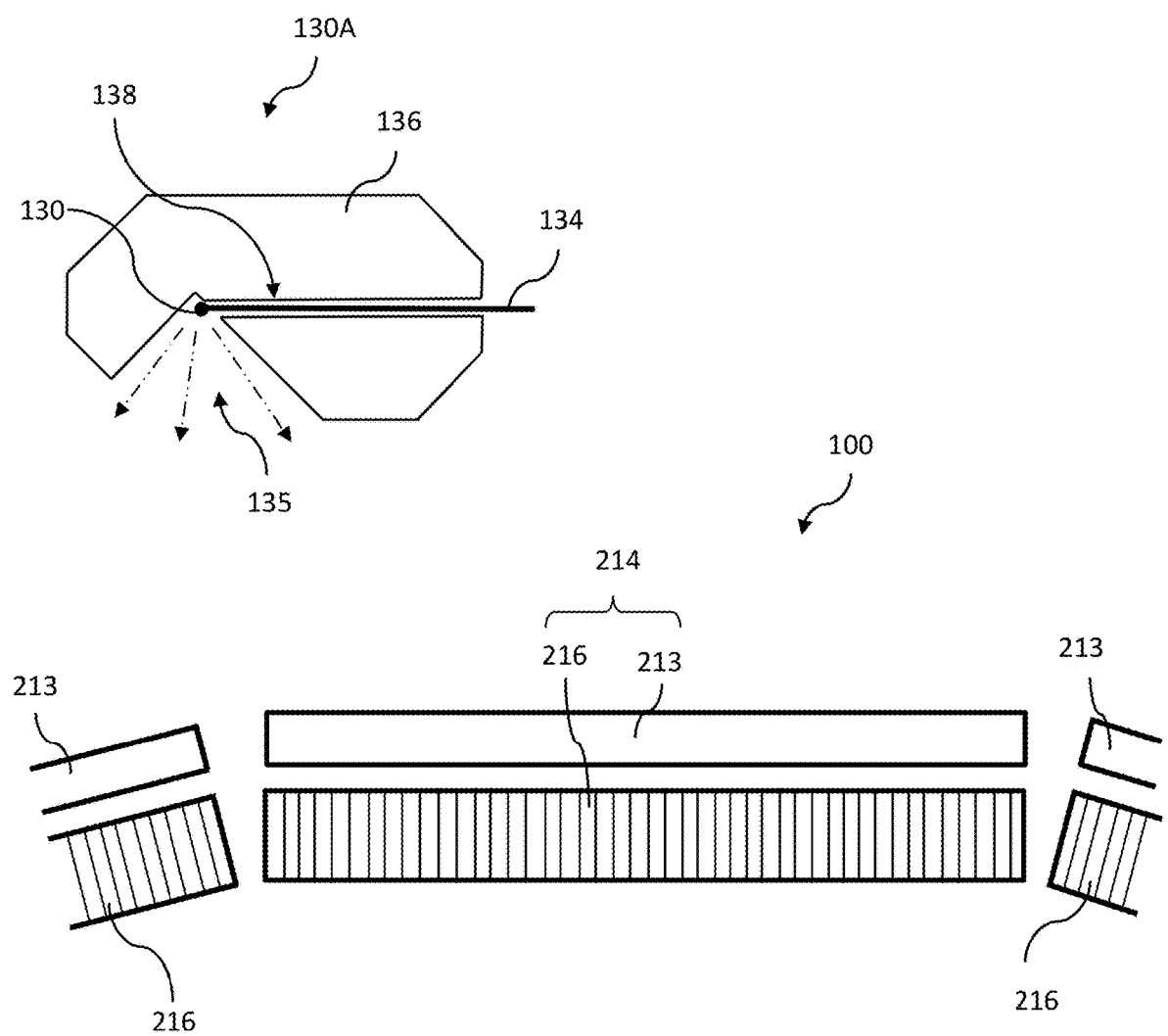
FIG. 2 is a schematic illustration of a gamma-ray source in position on the back side of a PET detector and provided within a tungsten radiation shield in an "ON" configuration where the gamma rays from the gamma-ray source illuminate the detector scintillation crystals.
Figure 3:
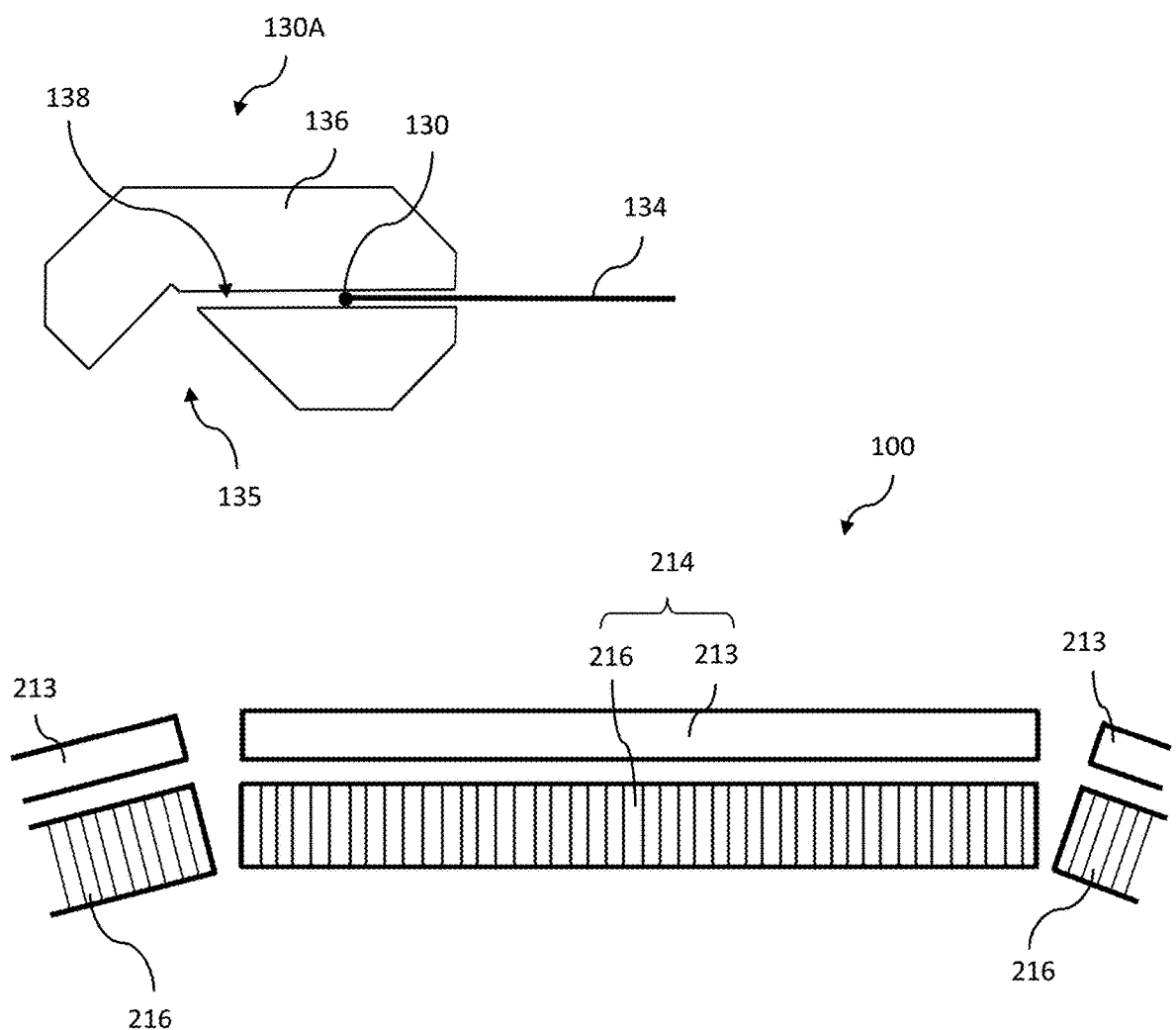
FIG. 3 is a schematic illustration of a gamma-ray source in position on the back side of a PET detector and provided within a tungsten radiation shield in an "OFF" configuration where the tungsten radiation shield is absorbing the gamma radiation from the gamma-ray source.

FIGS. 2 and 3 are schematic illustrations of an example of one gamma-ray source assembly 130A and the associated PET detector ring 100. The gamma-ray source assembly 130A is located so that the gamma-ray source 130 is positioned over a gap between two PET detector blocks 214 in the PET detector ring assembly 100. The gamma-ray source assembly 130A comprises a gamma-ray source 130 and a radiation-shielding housing 136 for the gamma-ray source 130. The gamma-ray source assembly 130A is configured to hold the gamma-ray source 130 and be switched between an ON configuration and an OFF configuration. In the ON configuration, other than the gamma photons from the gamma-ray source 130 that are traveling in the direction toward the PET detector blocks 214, the remainder of the gamma photons from the gamma-ray source 130 are substantially absorbed by the housing 136. In reality, radiation absorption is never 100%. Thus, "substantially absorbed" refers to the gamma photons being strongly attenuated. The radiation-shielding housing 136 can be comprised of a radiation attenuating material such as tungsten.

In the illustrated example, the gamma-ray source 130 is attached to an end of an articulating rod 134 that can manipulate the position of the gamma-ray source 130 within the housing 136 between the ON configuration and the OFF configuration. The radiation-shielding housing 136 can comprise a channel 138 and in the OFF configuration, the gamma-ray source 130 can be retracted into the channel 138 as shown in FIG. 3 so that the gamma photons emanating from the source is absorbed by the housing 136. In the ON configuration, the articulating rod 134 extends the gamma-ray source 130 out of the channel 138. In the ON configuration, the gamma-ray source 130 can be positioned in an opening 135 that is open toward the detector blocks 214.

Figure 4A:
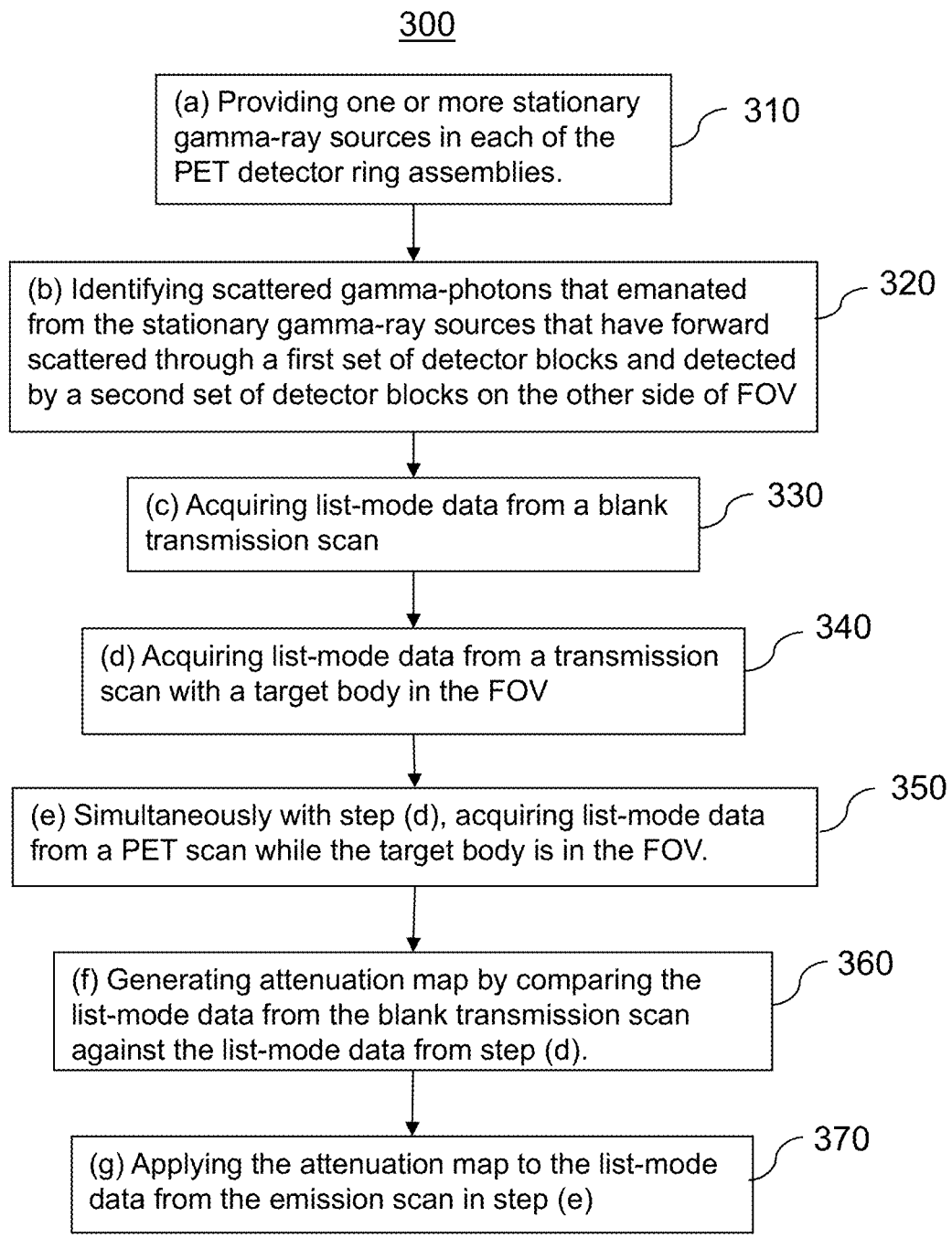
FIG. 4A is a flowchart illustration of a method according to an embodiment of the present disclosure.

FIG. 4A is a flow chart 300 illustrating the method for using one or more stationary gamma-ray sources 130 in a PET scanner as a transmission scan radiation source for generating scan data (list mode data) that can be used to generate attenuation maps is disclosed. The method comprises: (a) providing one or more stationary gamma-ray sources 130 in each of the PET detector ring assemblies 100 where the stationary gamma-ray sources are positioned outside the detector ring assembly 100, (box 310); (b) identifying forward scattered gamma-photons 12 which are gamma-photons that emanated from the stationary gamma-ray sources 130 that have forward scattered through a scintillator crystal in a first set of detector blocks 214 in a PET detector ring assembly, traversed through the FOV of the PET scanner, and are detected by a scintillator crystal in a second set of detector blocks in the PET detector ring assembly, via the PET scanner's coincidence electronics, (box 320); (c) acquiring list-mode data from a blank transmission scan (i.e. with no activity in the FOV), (box 330); (d) acquiring list-mode data from a transmission scan with a target body in the FOV, (box 340); (e) simultaneously with step (d), acquiring list-mode data from a PET scan while the target body is in the FOV, (box 350); (f) generating an attenuation map (a mu map) by comparing the list-mode data from the blank transmission scan against the list-mode data from the transmission scan with the target body in the FOV, (box 360); and (g) applying the attenuation map to the list-mode data from the emission scan in step (e) to effect attenuation correction on the list-mode data from the emission scan, (box 370).

In another aspect, the PET scanner system 200 is configured to perform the method described in flowchart 300 is disclosed. The PET system comprises: a plurality of detector ring assemblies 100 comprising a plurality of scintillator crystals; a machine-readable storage medium 250; and a system controller connected to and in communication with said detector ring assemblies, wherein the machine-readable storage medium is encoded with a computer program code such that, when the computer program code is executed by the system controller 290, the system controller performs the method comprising: (a) providing one or more stationary gamma-ray sources in each of the PET detector ring assemblies where the stationary gamma-ray sources are positioned outside the detector ring assembly; (b) identifying forward scattered gamma-photons which are gamma-photons that emanated from the stationary gamma-ray sources that have forward scattered through a scintillator crystal in a first set of detector blocks in a PET detector ring assembly, traversed through the FOV of the PET scanner, and detected by a scintillator crystal in a second set of detector blocks in the PET detector ring assembly, via the PET scanner's coincidence electronics; (c) acquiring list-mode data from a blank transmission scan (i.e. with no activity in the FOV); (d) acquiring list-mode data from a transmission scan with a target body in the FOV; (e) simultaneously with step (d), acquiring list-mode data from a PET scan while the target body is in the FOV; (f) generating an attenuation map (a mu map) by comparing the list-mode data from the blank transmission scan against the list-mode data from the transmission scan with the target body in the FOV; and (g) applying the attenuation map to the list-mode data from the emission scan in step (e) to effect attenuation correction on the list-mode data from the emission scan.

In some embodiments, time-of-flight (TOF) consideration is applied to improve the quality of the transmission scan signal from the forward scattered gamma-photons. Referring to the flowchart 400 in FIG. 4B, applying TOF consideration to the transmission imaging scan using the stationary gamma-ray sources 130 comprises: (a) calculating a time-of-flight for scattered photons, which are photons from the gamma-ray sources that have undergone Compton scatter in the first scintillator crystal in the first detector block 214a, to reach a second scintillator crystal in the second detector block 214b, based on the distance between the two scintillator crystals. (See block 410). This step calculates what the TOF should be for a gamma-photon to travel from the first scintillator crystal to a second scintillator crystal on the opposing side across the FOV in a given PET scanner. In other words, the distance of interest here is the distance from the first detector block 214a (specifically a scintillator crystal associated with the first detector), in which the Compton scatter of the gamma photon occurs, to the second detector block 214b (specifically the scintillator crystal in the second detector) in which the coincidental scattered gamma-photon is detected. Next, (b) a time window is defined, where the time window has a width centered around the calculated TOF. (See block 420). Next, (c) TOF of actual scattered gamma-photons originating from the first scintillator crystal are measured with a scan target object in the PET scanner's FOV. (See block 430). Next, (d) the measured TOF from (c) are compared against the calculated TOF and the measured TOF that are within the time window are identified. (See block 440). Then, (e) the scattered gamma-photons corresponding to those measured TOF that are within the time window are identified as transmission source events originating from the Compton scattering in the first scintillator crystal, thereby discriminating the transmission type data from the gamma emitting annihilation events within the scan target object and random events. (See block 450). The resulting transmission scan data thus obtained can be used to generate attenuation maps for correcting the primary PET emission scan data.

In some embodiments, the step (c) in flowchart 400 can further comprise simultaneously acquiring PET emission scan data of the scan target object in the PET scanner's FOV.

In another aspect, the PET scanner system 200 is configured to perform the method described in flowchart 400 is disclosed. The PET system comprises: a plurality of detector ring assemblies 100 comprising a plurality of scintillator crystals; a machine-readable storage medium 250; and a system controller connected to and in communication with said detector ring assemblies, wherein the machine-readable storage medium is encoded with a computer program code such that, when the computer program code is executed by the system controller 290, the system controller performs the method comprising: (a) calculating a TOF for scattered photons, which are photons from the gamma-ray sources that have undergone Compton scatter in the first scintillator crystal in the first detector block, to reach a second scintillator crystal in the second detector block, based on the distance between the two scintillator crystals. This step calculates what the TOF should be for a gamma-photon to travel from the first scintillator crystal to a second scintillator crystal on the opposing side across the FOV in a given PET scanner. In other words, the distance of interest here is the distance from the first detector block (specifically a scintillator crystal associated with the first detector), in which the Compton scatter of the gamma photon occurs, to the second detector block (specifically the scintillator crystal in the second detector) in which the coincidental scattered gamma-photon is detected. Next, (b) a time window is defined, where the time window has a width centered around the calculated TOF. Next, (c) TOF of actual scattered gamma-photons originating from the first scintillator crystal are measured with a scan target object in the PET scanner's FOV. Next, (d) the measured TOF from (c) are compared against the calculated TOF and the measured TOF that are within the time window are identified. Then, (e) the scattered gamma-photons corresponding to those measured TOF that are within the time window are identified as transmission source events originating from the Compton scattering (forward scattering) in the first scintillator crystal, thereby discriminating the transmission type data from the gamma emitting annihilation events within the scan target object and random events.

The use of stationary gamma-ray sources to acquire improved transmission scan data can be applied to PET/CT scanners as well as PET/MR scanners.

Using Cs-137 as the gamma-ray source, inventors experimentally confirmed that forward-scattered Cs-137 gamma rays provide improved transmission imaging in PET scanner compared to using the LSO background radiation by generating the transmission imaging data faster to generate attenuation μ-map without the CT hardware. The experimental work is provided below.

[Experimental Data]

The disclosed invention was demonstrated using a 6-ring Biograph Vision PET/CT scanner with LSO scintillating and SiPM-based detectors. Each ring of the scanner comprised 38 detector blocks of size 64 mm by 32 mm, and each block contained 200 crystals of size 3.2×3.2×20 mm. Annihilation radiation in the measurement (511 keV) was created by a 23 MBq sealed $^{68}$Ge source (germanium) in a thin steel tube. The Cs-137 source, sealed in a lightweight housing, had a nominal strength of 115 MBq.

Figures 5A, 5B:
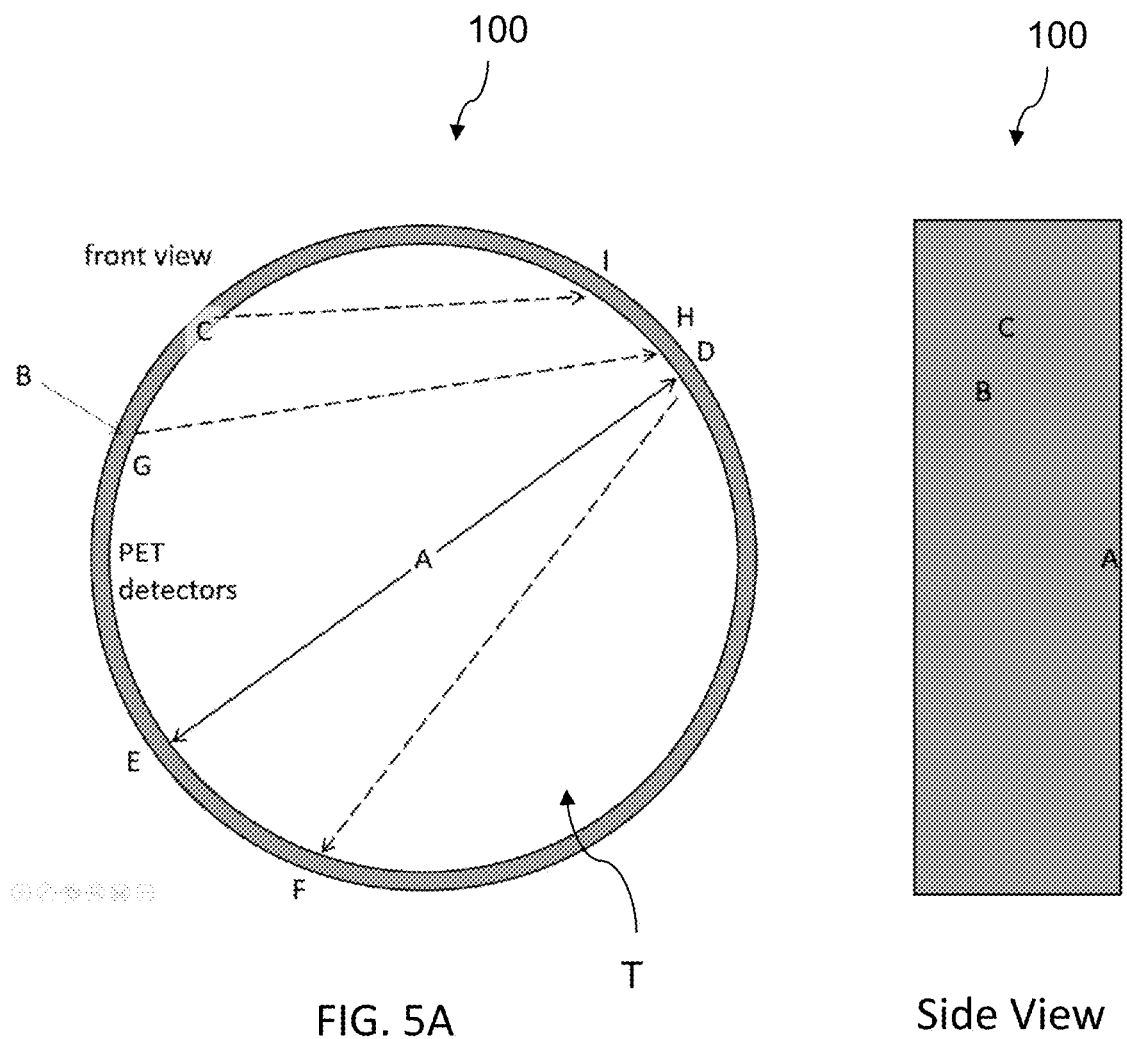
FIGS. 5A and 5B are front and side view schematic illustrations, respectively, of a PET scanner used in the experimental verification showing the locations of different radioactivity involved in the measurements.

List-mode data (LM) were acquired in five scans and can be explained with reference to FIGS. 5A and 5B. Scan 1 was a 30-minute acquisition with no activity near the scanner, apart from the LSO background, and no objects in the FOV, not even the patient bed. Scan 2 was a 30-minute acquisition with the germanium source in location (A) near the scanner's transaxial center but at or just beyond the end of the axial range. Scan 3 was a 15-minute scan with the cesium source in position B, about 25 cm beyond the ring of detectors. Scan 5 was the same as scan 4 except that the patient bed was placed in the FOV to provide a simple phantom. Detected radiation corresponded to various physical phenomena, including: normal PET coincidences (the line DE in FIG. 5A); backscatter (line DF in FIG. 5A) due to 511 or 662 keV photons from A; forward scatter (line GH in FIG. 5A) of photons from a Cs-137 source at point B; and LSO scintillation crystal background (line CI in FIG. 5A). The LSO is distributed around the PET detector ring 100 but just one exemplary location is indicated as (C) in FIG. 5A.

The measurements were made with unusual PET-scanner settings. The energy window was opened wide to accept events with an energy of 160 to 730 keV. Also, the coincidence timing window was set to 6.64 ns, corresponding to a maximum chord length of about one meter. In normal PET imaging, both are restricted.

LM data included the following information for each coincidence event: the energy signals of each photon, discretized in bins of width 2.8 keV; crystal identification for each photon; TOF; and a bit indicating whether the coincidence was prompt or delayed. Data from each scan were sorted for two kinds of analysis. First, without restricting TOF, two-dimensional (2D) energy histograms were created for the prompt coincidences, using 200×200 bins, and a matching histogram was created for the delayed ones. In these histograms, the energy of a photon in one detector, $E_A$, is represented on the horizontal axis and the energy of the other coincident photon, $E_B$, is represented on the vertical axis. Second, without restricting the energy, a sinogram of net-true coincidences was created, in which events were only used when TOF corresponded to the distance between the two crystals, plus minus 215 ps.

For transmission imaging, one would use the emitted photons from the stationary Cs-137 sources 130 efficiently and allow them to scatter from nearly all crystals in the PET detector ring 100 so that essentially all lines of response are sampled. The Cs-137 sources should be close to the PET detectors 214 but far enough away to maintain an acceptable singles rate. One way to do this is to distribute the stationary Cs-137 sources 130 in the PET detector ring 100 as shown in FIG. 1C. Since Biograph Vision PET scanner uses nineteen detector electronic assemblies 110, nineteen angular positions are shown in FIG. 1C. At each angle, two axial positions would be used, so the total number of sources should be 38.

The 38-source geometry was not used in the experiment described above, yet one can estimate the resulting sinogram with the following calculation. Let $S_{bg-blank}$ and $S_{cs1-blank}$ be the sinograms derived from scan 1 and scan 4, respectively. These were 3D sinograms but, in the analysis, it will be enough to treat them as 2D functions of radial and angular sinogram coordinates, summing all slices and all sinogram segments. One supposes that a different source strength, As, could be used in a new design, not 115 MBq as in the test described here. The 38-source sinogram in this case, including LSO background radiation, would be described by $$s_{cs38-blank} = s_{bg-blank} + 2\frac{A_s}{115\,MBq} \times \sum_{19\,angles} R(s_{cs1-blank} - s_{bg-blank}) \quad (1)$$

Since different scan times were used for the two input sinograms, $S_{bg-blank}$ was divided by two before calculations were performed. In the equation, R is an operator that rotates the sinogram by one of the nineteen angles and the factor of 2 accounts for source placement in two axial positions. The rotation has to be performed carefully. The sinograms were converted from 180 to 360 degrees, then (1) was applied, then they were returned to the 180-degree representation.

One can determine how much faster a transmission scan can be performed with the cesium method, giving about the same image quality as in a long scan by the LSO background method. The gain is approximately $$\text{gain} = \frac{\text{total}(s_{cs38-blank})}{\text{total}(s_{bg-blank})}. \quad (2)$$

Since (1) is linear, the gain can also be calculated simply, without actually performing the rotations, as $$\text{gain} = 1 + 38 \times \frac{\text{total}(s_{cs1-blank} - s_{bg-blank})}{\text{total}(s_{bg-blank})} \times \frac{A_s}{115\,MBq}. \quad (3)$$

Cautions about using (1,2,3) are presented in Discussion section below.

[Results]

Figure 6:
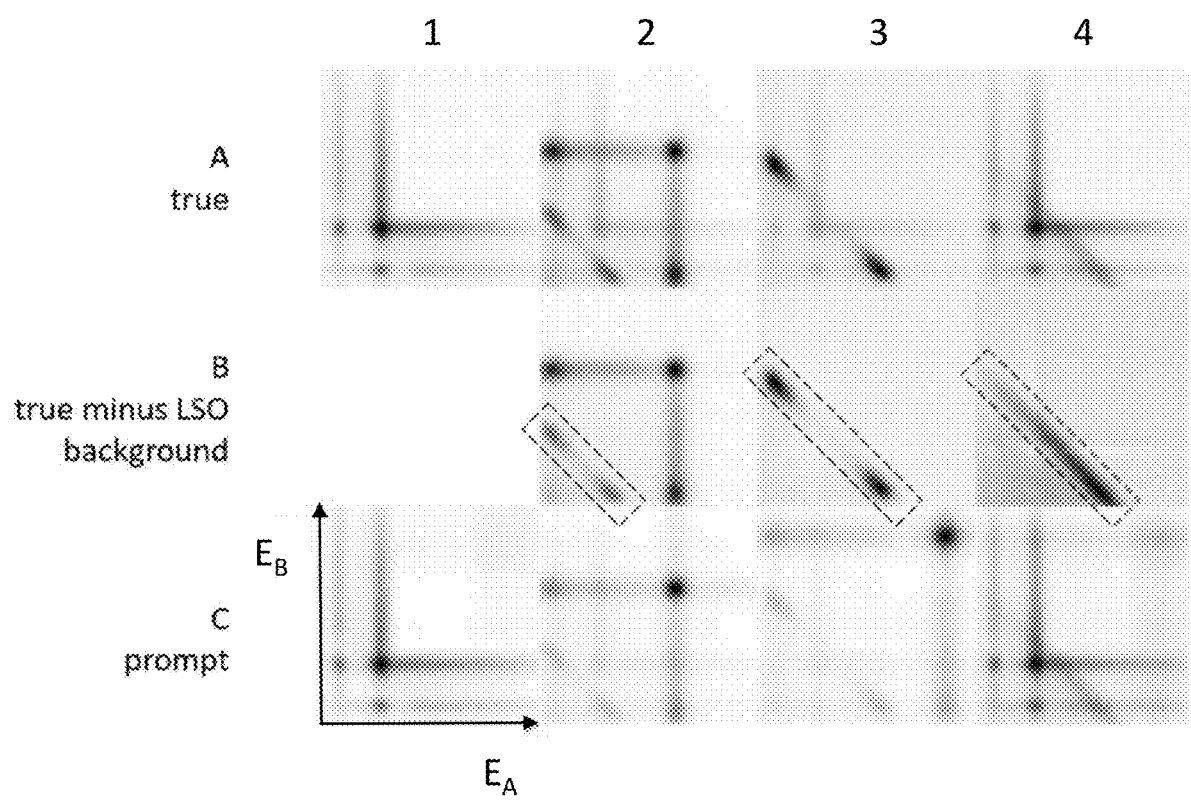
FIG. 6 are 2D energy histograms from scans 1, 2, 3, and 4 conducted in the experimental verification.

2D energy histograms from scans 1, 2, 3, and 4 are shown in FIG. 6. In these, the energy range is 160 to 730 keV for each photon, as mentioned above. Prompt coincidences are shown in the bottom row and net-true coincidences (prompt minus delayed) in the top row. The middle row shows the net-true histograms with the LSO background subtracted, with a correction for the different scan times. The column representing scan 1 shows the expected energy spectra, including a spectrum of beta and gamma radiation in one detector and a 202 or 307-keV photopeak in the other one. The scan-2 column shows normal PET coincidences with several features of interest. Near the upper right corner, one sees a small circular pattern representing 511 keV photopeaks in each detector. Below this and to the left, one sees the signature of scattered radiation in the source or in one of the detectors, including another prominent feature at the low end of the energy range, representing 511-keV backscatter through angles near 180 degrees. Also shown as a diagonal box in part 2-B is the locus of points for which $E_A+E_B=511$ keV, $E_A$ and $E_B$ representing the energies of the pair of coincidence events referred to as A and B. These represent backscatter of 511-keV photons, like the line DF in FIG. 5. Most of the backscatter overlaps with the LSO background. The scan-3 column, where one photon at a time was emitted from the cesium source, shows random coincidences in the bottom row but these disappear in the top row where delayed coincidences have been subtracted. In this case another diagonal locus is shown, representing $E_A+E_B=662$ keV, for each pair of coincidence events A and B generated by the 662-keV photons from the cesium source. These represent backscatter of 662-keV photons from the cesium source. Again, this signature of backscatter overlaps strongly with the LSO background. The scan-4 column shows the forward-scattered radiation on lines like GH in FIG. 5. The locus of points representing $E_A+E_B=662$ keV is again shown. Notably, the signature of these photon pairs did not overlap as strongly with the LSO background radiation. The more favorable energy range is potential advantage of the forward-scattering approach, in addition to the fact that sources need not be placed inside the FOV, a space best reserved for the patient.

Figure 7:
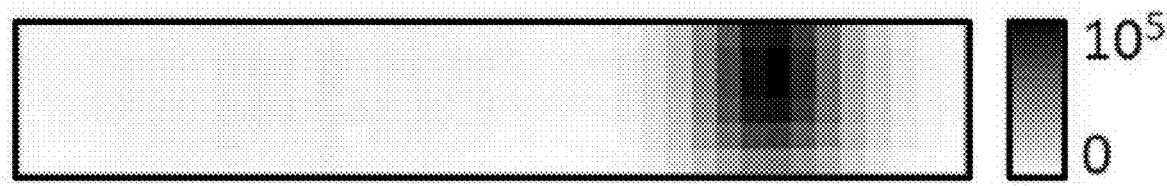
FIG. 7 is a grayscale representation showing the distribution of singles rates in the 228 detector blocks in the 6-ring Biograph Vision PET/CT scanner used in the experimental verification.

As for scan 4, FIG. 7 uses a grayscale representation to show the distribution of singles rates in the scanner's 228 detector blocks. The horizontal direction corresponds to the scanner's circumference and the vertical direction corresponds to the scanner's axial dimension. The maximum singles rate was about $1\times10^5$ counts/block in the area near the cesium source, compared to about $1\times10^4$ counts/block in areas where singles were mainly from LSO background radiation. The shape of the distribution confirmed that the source position was about 25 cm beyond the detectors. One expects that the actual amount of radiation striking the detectors was more than this, because the singles rate only included events in which the deposited energy was above the arming threshold of about 150 keV, and one expects roughly half of 662-keV Compton scattering to result in a recoiling electron with energy below that. A simple simulation suggested that about 40% of the incident radiation was detected in singles mode. Other relevant effects include absorption and scattering by materials between the detector crystals and the sources, for example electronics and an aluminum channel, 3 to 8 mm thick, to hold coolant that stabilized the detectors during use.

Figure 8:
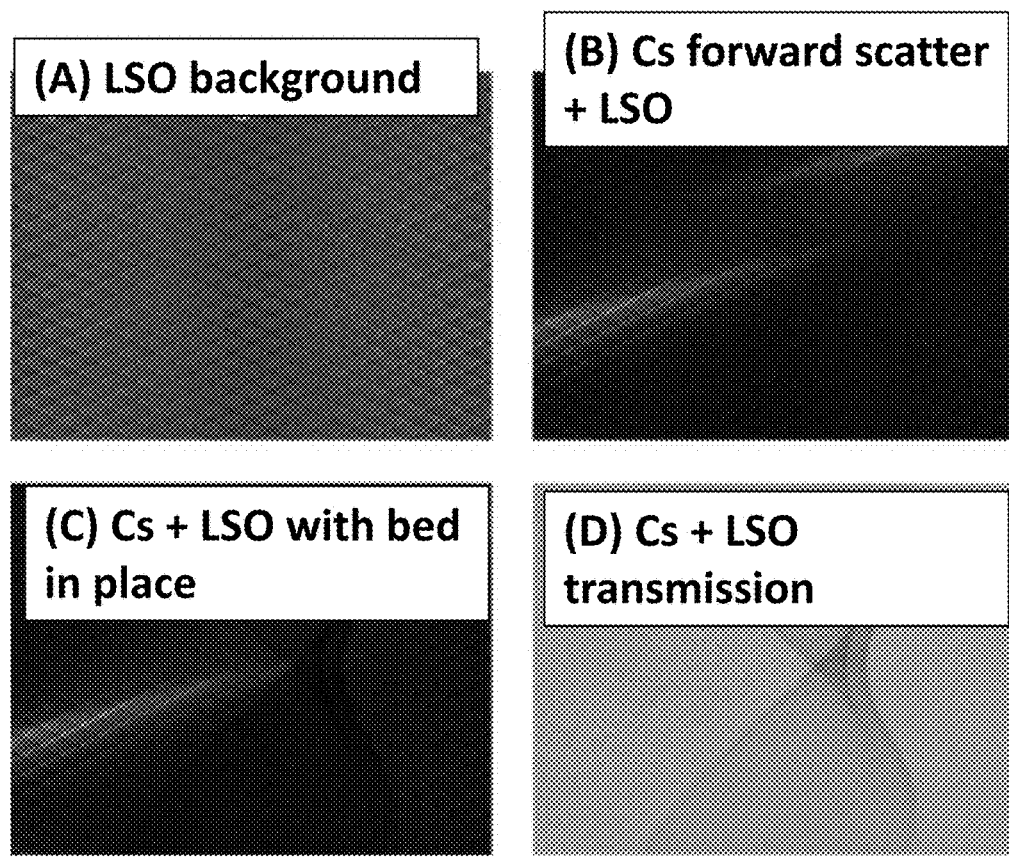
FIG. 8 shows the net-true sinograms from scans 1, 4, and 5 conducted in the experimental verification.

FIG. 8 shows the net-true sinograms from scans 1, 4, and 5 (parts A, B, C of the figure) and also the ratio of the scan-5 sinogram to the scan-4 sinogram (part D). The sinograms had 520 radial bins and 399 angular bins. The LSO-background sinogram from scan 1 was mainly featureless except for the expected pattern of high and low values at the edges of detector blocks, and the lower number of counts in the middle, due to solid-angle variations with position. The cesium spectrum from scan 4 featured a prominent diagonally-oriented feature due to forward-scattered radiation. As expected, sinogram regions corresponding to small-angle scatter were reduced in brightness because less than 150 keV was imparted to the crystal where scattering occurred, that is, the electron recoil energy was too low to detect. The transmission sinogram from scan 5, and the ratio sinogram, show the gamma-ray shadow of the patient bed, and indicated the possibility of estimating the map of attenuation coefficients from these measurements.

Figure 9:
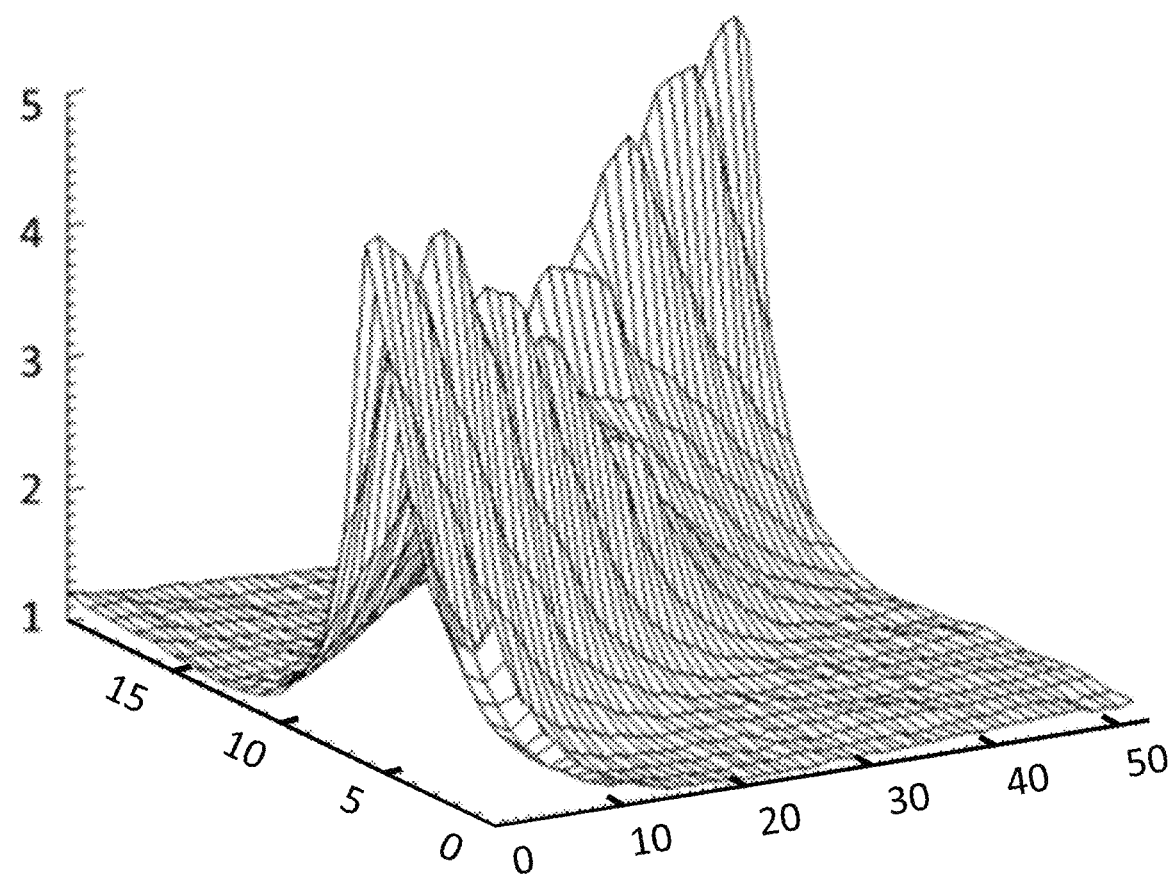
FIG. 9 is a plot showing the ratio of rebinned sinograms, $S_{csl-blank}/S_{bg-blank}$.
Figure 10:
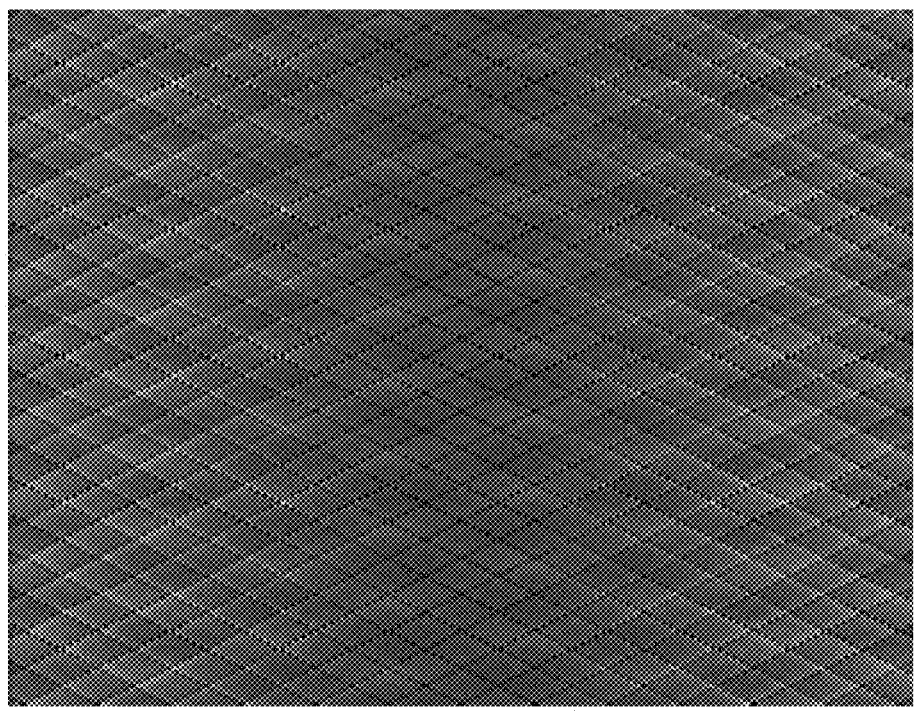
FIG. 10 is an illustration of an estimated 38-source sinogram.

To illustrate and quantify the sensitivity gain due to cesium, the sinograms from scans 1 and 4 were rebinned from 520 radial bins by 399 angular bins to 52×19. The ratio of the rebinned sinograms, again accounting for the different scan durations, was calculated in each of the coarse bins. The ratio varied between 1.00 and 4.77 (FIG. 9). A 38-source sinogram was estimated from (1) and is illustrated in FIG. 10, which shows that its uniformity was similar to the sinogram from scan 1. Relative to the sinogram from scan 1, the estimated 38-source sinogram had 19.6 times as many counts in the middle of the radial range and 23.2 times as many at the ends. Using (3), the sensitivity gain for the 38-source geometry was calculated to be $$\text{sensitivity gain (38 sources)} = 1 + 21.2 \times \frac{A_s}{115\,MBq}. \quad (4)$$

It is of interest to quantify the efficiency with which radiation from the LSO background or from the cesium source was detected in these experiments. Table I lists the source activity and the sinogram counting rates in scans 1 to 4. To estimate the corresponding efficiencies, let $N\Omega/4\pi$ be the number of transmission photons per decay of a $^{176}$Lu or $^{137}$Cs nucleus, multiplied by the geometric efficiency for radiation that would provide a start signal for the coincidence electronics. In the case of LSO, the start signal would arise from a cascade of beta and gamma radiation, and $N=2$ because, as FIG. 6 shows, photons of either 202 or 307 keV could be detected in coincidence. In this case, $\Omega$ was set to $4\pi$ sr since $^{176}$Lu atoms were surrounded by scintillator on all sides. In the case of cesium, the start signal would be due to a scattering 662-keV gamma ray. In this case, one sets $N=1$ because only the scattered photon can be detected in coincidence, and $\Omega$ was calculated as the sum of the solid angles, from the position of the cesium source, of all detector blocks whose back sides faced the source. The table lists $N\Omega/4\pi$ and a quantity that is here called the coincidence efficiency. This is defined as $$\text{coincidence efficiency} = \frac{\text{sinogram rate/activity}}{N\Omega/4\pi}. \quad (5)$$

TABLE I

SINOGRAM COUNT RATE NORMALIZED TO ACTIVITY

|  | LSO background (scan 1) | cesium (scan 4) |
| --- | --- | --- |
| activity (Bq) | 2.24E+06 | 1.15E+08 |
| sinogram rate (counts/s) | 1.67E+04 | 8.87E+03 |
| sinogram rate/activity | 7.44E−03 | 7.73E−05 |
| $N\Omega/4\pi$ | 2 | 0.063 |
| coincidence efficiency | 3.72E−03 | 1.24E−3 |

[Discussion of the Experimental Data]

The experimental data presented herein demonstrated the feasibility of a speed-up in transmission imaging based on coincidences like the ones from LSO background. The investigation showed that forward-scattered cesium gamma rays can provide such a speed-up. Use of the forward-scattering gamma-photon approach of the present disclosure provides advantages such as: the hardware, stationary gamma-ray sources, can be straightforwardly built into the PET scanner; only a few, simple moving parts for the gamma-ray source housing may be needed; potentially no CT scanner is needed; and nothing blocks the PET FOV or restrict the PET FOV diameter.

In a carefully engineered implementation, the sources would be provided with collimating shielding, allowing gamma rays directed toward the detectors to shine with full intensity whereas gamma rays directed in other directions would be absorbed by the shielding, reducing radiation exposure to people near the scanner.

There are reasons to suppose that the speed-up or sensitivity gain predicted by equation (4) underestimates the advantages of the forward-scattering approach. First, the scan-1 sinogram, used in this analysis, combined the 202 and 307-keV gamma rays emitted by $^{176}$LU; yet experience has shown that it may be better to use only the 307 keV one. Second, the forward-scattered gamma rays from cesium mostly have higher energy than lutetium gamma rays. Once can see this from part 4B of FIG. 6. Higher energy results in advantages including lower attenuation as radiation penetrates through phantoms and patients' bodies. Also, less scatter is expected, and fewer complications due to backscattering of 511-keV radiation from the patient.

Physical effects at the low end of the energy range are important in the use of forward-scattered radiation. This is shown by part (B) of FIG. 8. The angular distribution of Compton scattering at 662 keV favors small angles, yet scattering at the smallest angles leaves only a little energy in the scintillator crystal, and this may be below the scanner's low-energy threshold. As a consequence, much of the scattered radiation cannot be detected. The use of multiple cesium sources, as shown in FIG. 1C, results in a sinogram without sharply defined edges. This is shown by FIG. 10, where nineteen source positions have been combined with a calculation.

A figure of merit called coincidence efficiency was introduced to account for the relative efficiencies of the two methods. LSO background and cesium forward scattering. Equation (5) and Table I indicates that LSO background radiation can be used efficiently because $^{176}$Lu beta decays are detected in nearly 100% of all decays, and two gamma rays are emitted in each decay. In the experiment, the cesium source was positioned close to the ring of PET detectors, resulting in a solid angle of 6.3% of 4π steradians. Considering all factors, the forward-scattering method was shown to be fairly efficient, $1.24 \times 10^{-3}$ compared to $3.72 \times 10^{-3}$ in the case of LSO background. To explain why some coincidences that might have been detected were in fact not seen, one calls attention to three effects. First, some of the 662-keV gamma rays may have passed through the detectors without interacting at all, or were scattered or absorbed by materials between the source and the scintillator. These effects are estimated to account for a loss of about 40% in the case of the detector blocks closest to the cesium source. Second, some of the gamma rays may have entered the detectors and scattered through angles less than 40 degrees, leaving an amount of energy that fell below the detection threshold. This effect is estimated to reduce detection rates by another factor of about 40%, based on simple analysis of the Compton scattering formula with weighting by the sine of the scattering angle. These two effects, by themselves, account for most of the missing coincidences. A third type of effect also happened where after scattering, most of the photons were not directed toward a detector on the other side of the FOV. Because this overall geometrical efficiency factor would have been similar in the case of LSO background emissions, the ratio of the two coincidence efficiencies in Table I is not easily predicted. To summarize, the ratio is close to the amount one would expect based on a simple calculation.

To use forward scattering in a practical way in a PET scanner, there is a tradeoff between radiation hazard, real or perceived, and the quality of transmission images. Thus, one would determine the optimal amount of gamma-ray source material. In the example where Cs-137 is used, one could consider 38 sources with As=30 MBq per source, a total of 1110 MBq exactly matches the total Cs-137 content used in the ECAT ART PET scanner. Equation (4) suggests that the sensitivity gain in this case would be 6.5.

The experiment verified that forward scattering of gamma rays, using 662-keV gamma rays from Cs-137 as an example, can be used for transmission imaging in a PET scanner. Energy windows and coincidence timing windows should be opened wide in this application. The resulting sinogram can even be added to the sinogram of LSO background radiation. If such a PET scanner were manufactured with a total of 1110 MBq distributed among 38 cesium sources, transmission imaging in the 3-minute duration of a typical PET acquisition could have about the same quality as a 20-minute scan based on LSO background alone.

The principle that the photon energies $E_A$ and $E_B$ detected from each pair of coincidence events A and B from forward scattered gamma photons add up to the initial energy $E_I$ of the gamma-photons emitting from the gamma-ray source 130, i.e. $E_A + E_B = E_I$ can be utilized to have the PET system reject almost all background noise such as from false coincidence events. For a given gamma-ray source, one knows the $E_I$ of the gamma-photons from that source. For example, for Cs-137, $E_I$ is 662 keV. Thus, if Cs-137 is used as the gamma-ray source 130, the requirement $E_A + E_B = E_I = 662$ keV can be used to screen the true coincidence events resulting from the forward scattered Cs-137 gamma-photons to improve the quality of the identified transmission scan signals.

For example, in the method summarized in the flowchart 300 of FIG. 4A, the step (b) can comprise using the requirement $E_A + E_B = E_I$ to identify the forward scattered gamma-photons, where $E_A$ and $E_B$ are the photon energies detected from each pair of coincidence events A and B, respectively, where the event A is Compton scattering in the scintillator crystal in the first set of detector blocks and the event B is Compton scattering in the scintillator crystal in the second set of detector blocks, and $E_I$ is the initial energy of the gamma-photons emitting from the gamma-ray source.

Figure 4B:
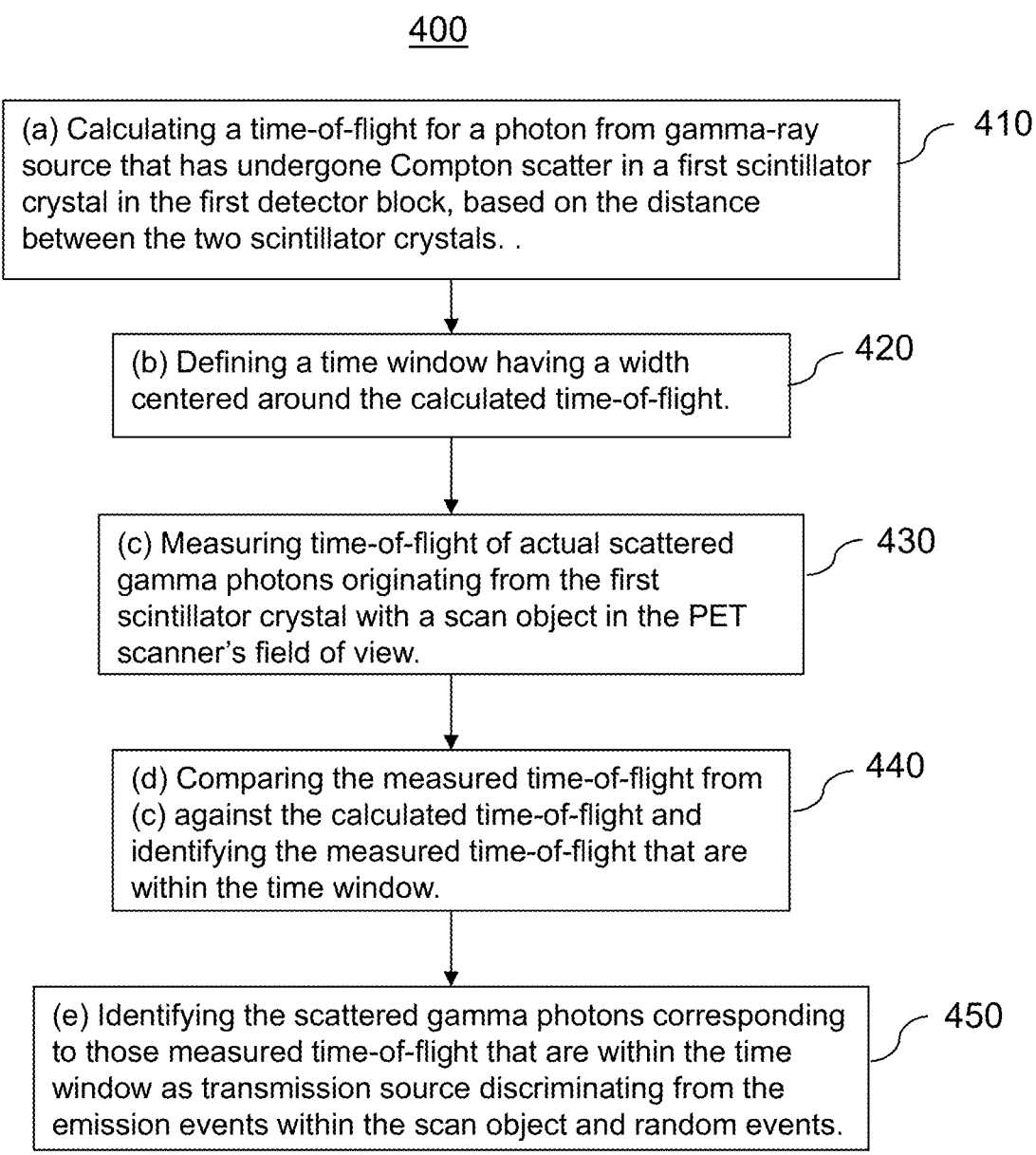
FIG. 4B is a flowchart illustration of a method according to another embodiment of the present disclosure.

In another example, in the method summarized in the flowchart 400 of FIG. 4B, the step (e) can comprise using the requirement $E_A + E_B = E_I$ to identify the forward scattered gamma-photons, wherein $E_A$ and $E_B$ are the photon energies detected from each pair of coincidence events A and B, respectively, where the event A is Compton scattering in the first scintillator crystal and the event B is Compton scattering in the second scintillator crystal, and wherein $E_I$ is the initial energy of the gamma-photons emitting from the gamma-ray source.

In some embodiments in which the PET detector's scintillator crystals are LSO crystals, the LSO crystal background radiation can also be used as transmission scan radiation to generate attenuation map according to the method previously disclosed in U.S. patent application Ser. No. 14/172,980, filed Feb. 5, 2014, the contents of which are incorporated by reference herein.

According to the disclosure presented above, provided is a positron emission tomography (PET) scanner system that comprises: a gantry; a plurality of PET detector ring assemblies provided within the gantry, wherein each detector ring assembly comprises a plurality of PET detectors arranged in a ring configuration around a central opening, wherein the plurality of PET detector ring assemblies are coaxially aligned along a longitudinal axis defined through the central openings; a patient tunnel extending through the central openings of the coaxially aligned PET detector ring assemblies, wherein the plurality of PET detector assemblies are coaxially aligned along a length of the patient tunnel, wherein each of the plurality of PET detectors comprising a detector and one or more scintillator crystals associated with the detector; and one or more stationary gamma-ray sources provided in each of the PET detector ring assembly within the gantry.

In the PET scanner system according to any of the above-mentioned embodiments, the one or more stationary gamma-ray sources in each of the PET detector ring assembly can be positioned behind the detector ring assembly away from the patient tunnel. In the PET scanner system according to any of the above-mentioned embodiments, the stationary gamma-ray sources can be Cs-137, cobalt-60, or sodium-22. In some embodiments of the PET scanner system, the stationary gamma-ray sources are Cs-137.

In any of the above embodiments of the PET scanner system, each of the gamma-ray sources can be provided in an assembly that provides radiation shielding.

In any of the above embodiments of the PET scanner system, the assembly that provides the radiation shielding can comprise an ON configuration and an OFF configuration, wherein when in the ON configuration, other than gamma photons from the Cs-137 that are traveling in the direction toward the detector assemblies, remainder of the gamma photons from the Cs-137 are substantially absorbed by the assembly that provides the radiation shielding. In any of the above embodiments of the PET scanner system, the assembly that provides the radiation shielding can be made of materials comprising at least in part tungsten.

In any of the above embodiments of the PET scanner system, the PET scanner can be a PET/MR scanner. In any of the above embodiments of the PET scanner system, the PET scanner can be a PET/CT scanner.

Although the subject matter has been described in terms of exemplary embodiments, it is not limited thereto. Rather, the appended claims should be construed broadly, to include other variants and embodiments, which may be made by those skilled in the art.

What is claimed is:

1. A positron emission tomography (PET) scanner system comprising:
   a gantry;
   a plurality of PET detector ring assemblies provided within the gantry, wherein each detector ring assembly comprises a plurality of PET detectors arranged in a ring configuration around a central opening, wherein the plurality of PET detector ring assemblies are coaxially aligned along a longitudinal axis defined through the central openings;
   a patient tunnel extending through the central openings of the coaxially aligned plurality of PET detector ring assemblies, wherein the plurality of PET detector assemblies are coaxially aligned along a length of the patient tunnel, wherein each of the plurality of PET detectors comprising a detector and one or more scintillator crystals associated with the detector; and
   one or more stationary gamma-ray sources provided in each of the plurality of PET detector ring assemblies within the gantry, wherein the one or more stationary gamma-ray sources in each of the plurality of PET detector ring assemblies are positioned behind a corresponding one of the plurality of PET detector ring assemblies away from the patient tunnel and configured to forward scatter gamma photons to at least a portion of the one or more scintillator crystals provided in the corresponding one of the plurality of PET detector ring assemblies.

2. The PET scanner system of claim 1, wherein the stationary gamma-ray sources are Cs-137, cobalt-60, or sodium-22.

3. The PET scanner system of claim 1, wherein the stationary gamma-ray sources are Cs-137.

4. The PET scanner system of claim 1, wherein each of the gamma-ray sources are provided in an assembly that provides radiation shielding.

5. The PET scanner system of claim 2, wherein each of the gamma-ray sources are provided in an assembly that provides radiation shielding.

6. The PET scanner system of claim 4, wherein the assembly that provides the radiation shielding comprises an ON configuration and an OFF configuration, wherein when in the ON configuration, other than gamma photons from the Cs-137 that are traveling in the direction toward the detector assemblies, remainder of the gamma photons from the Cs-137 are substantially absorbed by the assembly that provides the radiation shielding.

7. The PET scanner system of claim 5, wherein the assembly that provides the radiation shielding comprises an ON configuration and an OFF configuration, wherein when in the ON configuration, other than gamma photons from the Cs-137 that are traveling in the direction toward the detector assemblies, remainder of the gamma photons from the Cs-137 are substantially absorbed by the assembly that provides the radiation shielding.

8. The PET scanner system of claim 5, wherein the assembly that provides radiation shielding is comprised of at least in part tungsten.

9. The PET scanner system of claim 7, wherein the assembly that provides radiation shielding is comprised of at least in part tungsten.

10. The PET scanner system of claim 1, wherein the PET scanner is a PET/MR scanner.

11. The PET scanner system of claim 1, wherein the PET scanner is a PET/CT scanner.

12. A method for using one or more stationary gamma-ray sources provided in a PET scanner as a transmission scan radiation source for generating scan data that can be used to generate attenuation maps, wherein the PET scanner comprises a plurality of PET detector ring assemblies, the method comprising:
   (a) providing the one or more stationary gamma-ray sources in each of the plurality of PET detector ring assemblies where the stationary gamma-ray sources are positioned outside their corresponding one of the plurality of PET detector ring assemblies away from a patient tunnel and configured to forward scatter gamma photons to a first scintillator crystal provided in the corresponding one of the PET detector ring assemblies;
   (b) identifying the forward scattered gamma-photons which are gamma-photons that emanated from the stationary gamma-ray sources that have forward scattered through the first scintillator crystal in a first set of detector blocks in a first PET detector ring assembly of the plurality of PET detector ring assemblies, traversed through the PET scanner's field of view (FOV), and detected by a second scintillator crystal in a second set of detector blocks in the first PET detector ring assembly, via the PET scanner's coincidence electronics;
   (c) acquiring list-mode data from a blank transmission scan with no activity in the FOV;
   (d) acquiring list-mode data from a transmission scan with a target body in the FOV;
   (e) generating an attenuation map by comparing the list-mode data from the blank transmission scan against the list-mode data from the transmission scan with the target body in the FOV; and
   (f) applying the attenuation map to the list-mode data from the emission scan in step (e) to effect attenuation correction on the list-mode data from the emission scan.

13. The method of claim 12, further comprising simultaneously with step (d), acquiring list-mode data from a PET scan while the target body is in the FOV.

14. The method of claim 12, wherein the step (b) comprises using the requirement $E_A+E_B=E_I$ to identify the forward scattered gamma-photons, wherein $E_A$ and $E_B$ are the photon energies detected from each pair of coincidence events A and B, respectively, wherein the event A is Compton scattering in the first scintillator crystal in the first set of detector blocks and the event B is Compton scattering in the second scintillator crystal in the second set of detector blocks, and $E_I$ is the initial energy of the gamma-photons emitting from the gamma-ray source.

15. A method for improving the quality of the transmission scan signal from the forward scattered gamma-photons by applying time-of-flight (TOF) consideration to the transmission imaging scan using stationary gamma-ray sources comprises:
   (a) calculating a TOF for scattered photons, which are photons from the gamma-ray sources that have undergone Compton scatter in a first scintillator crystal in a first detector block, to reach a second scintillator crystal in a second detector block, based on the distance between the two scintillator crystals, wherein each of the gamma-ray sources are positioned outside a corresponding detector block away from a patient tunnel and forward scatter the photons to the corresponding detector block;
(b) a time window is defined, where the time window has a width centered around the calculated TOF;
(c) TOF of actual scattered gamma-photons originating from the first scintillator crystal are measured with a scan target object in the PET scanner's field of view (FOV);
(d) the measured TOF from (c) are compared against the calculated TOF and the measured TOF that are within the time window are identified; and
(e) identifying the forward scattered gamma-photons corresponding to those measured TOF that are within the time window as transmission source events originating from the Compton scattering in the first scintillator crystal, thereby discriminating the transmission type data from the gamma emitting annihilation events within the scan target object and random events.

16. The method of claim 15, wherein the step (c) further comprises simultaneously acquiring transmission scan data of the scan target object in the PET scanner's FOV.

17. The method of claim 16, further comprising acquiring PET emission scan data of the scan target object in the PET scanner's FOV simultaneously with step (c); and generating attenuation maps from the transmission scan data for correcting the PET emission scan data.

18. The method of claim 15, wherein the step (e) comprises using the requirement $E_A+E_B=E_I$ to identify the forward scattered gamma-photons, wherein $E_A$ and $E_B$ are the photon energies detected from each pair of coincidence events A and B, respectively, wherein the event A is the Compton scattering in the first scintillator crystal and the event B is the Compton scattering in the second scintillator crystal, and wherein $E_I$ is the initial energy of the gamma-photons emitting from the gamma-ray source.

* * * * *